United States Patent [19]  
Cooper

[11] 4,204,911  
[45] May 27, 1980

[54] METHOD AND APPARATUS FOR REMOVING IODINE FROM A NUCLEAR REACTOR COOLANT

[75] Inventor: Martin H. Cooper, Monroeville, Pa.

[73] Assignee: Westinghouse Electric Corp., Pittsburgh, Pa.

[21] Appl. No.: 668,162

[22] Filed: Mar. 16, 1976

Related U.S. Application Data

[63] Continuation of Ser. No. 493,373, Jul. 31, 1974, abandoned, which is a continuation of Ser. No. 263,054, Jun. 15, 1972, abandoned.

[51] Int. Cl.² .............................................. G21C 19/30
[52] U.S. Cl. ........................................ 176/37; 176/40; 252/301.1 R
[58] Field of Search ....................... 176/37, 38, 16, 40; 252/301.1 R; 423/249; 210/179

[56] References Cited

U.S. PATENT DOCUMENTS

| | | | |
|---|---|---|---|
| 3,107,155 | 10/1963 | Gleason | 23/218 |
| 3,240,555 | 3/1966 | Nash | 23/2 |
| 3,618,770 | 11/1971 | Pohl et al. | 210/179 |
| 3,693,959 | 9/1972 | Swinhoe et al. | 176/38 |
| 3,803,295 | 4/1974 | Cathers et al. | 423/249 |
| 3,920,577 | 11/1975 | Godbee | 252/301.1 W |

FOREIGN PATENT DOCUMENTS 44-1052  1/1969  Japan ........................................ 176/37

OTHER PUBLICATIONS

1974 Annual Book of ASTM Standards, "Standard Methods of Testing for Radioactive Iodine in Water", 1974, pp. 526–534.

Primary Examiner—Samuel W. Engle  
Assistant Examiner—Ralph Palo  
Attorney, Agent, or Firm—Edward L. Levine; Z. L. Dermer

[57] ABSTRACT

A method and apparatus for removing iodine-131 and iodine-125 from a liquid sodium reactor coolant. Non-radioactive iodine is dissolved in hot liquid sodium to increase the total iodine concentration. Subsequent precipitation of the iodine in a cold trap removes both the radioactive iodine isotopes as well as the non-radioactive iodine.

16 Claims, 1 Drawing Figure

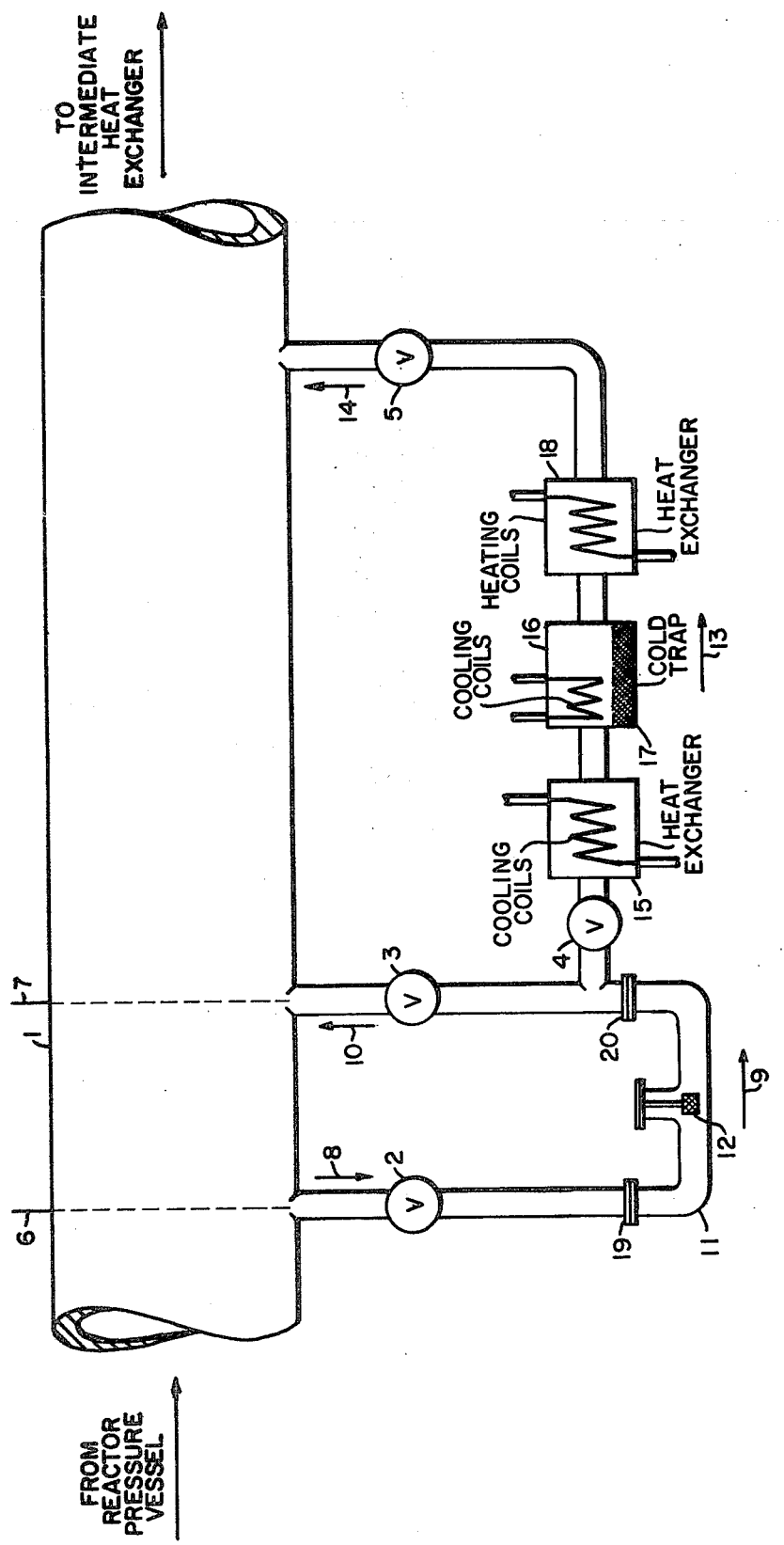

METHOD AND APPARATUS FOR REMOVING IODINE FROM A NUCLEAR REACTOR COOLANT

This is a continuation of application Ser. No. 493,373 filed July 31, 1974, now abandoned, a continuation of Ser. No. 263,054 June 15, 1972 now abandoned.

BACKGROUND OF THE INVENTION

1. Field of the Invention

This invention relates generally to nuclear reactors and more particularly to nuclear reactor safety and the elimination of health hazards.

2. Description of the Prior Art

A nuclear reactor is designed and operated for the purpose of initiating and maintaining a nuclear fission chain reaction in a fissile material for the generation of heat for power purposes. In the type of nuclear reactor described herein, fissile materials such as plutonium-239 and uranium-238, are contained within fuel rods or elements. A plurality of fuel elements comprise a nuclear core which is structurally supported within a hermetically sealed pressure vessel. A reactor coolant, such as liquid sodium, is circulated into the pressure vessel and through the nuclear core where the heat generated by nuclear fission is transferred from the fuel elements to the reactor coolant. The heated reactor coolant exits from the pressure vessel and flows to a heat exchanger where the heat previously acquired is transferred to another flow system coupled in sealing arrangement with the heat exchanger. The cooled liquid sodium exits from the heat exchanger and flows to a pump which again circulates the reactor coolant into the pressure vessel, repeating the described flow cycle. The system comprising the nuclear core, pressure vessel, heat exchanger, circulating pump, and the connecting piping is commonly referred to as the primary system.

The heat transferred from the reactor coolant on flowing through the heat exchanger is eventually transformed into steam which is converted into electrical energy by means of a conventional steam generator, steam turbines, and electrical generator apparatus. This system, by which the heat is converted into electricity, is known as the secondary system.

During operation of the nuclear reactor, fission gas and solids are produced by fission of the fissile nuclear fuel. These fission products generally contain radioactive nuclides including iodine-131 and iodine-125. Should these radioactive nuclides be released to the reactor coolant in the primary system, a biological hazard and a reactor safety problem may exist.

The health and safety problem is caused mainly by deposition of the radioactive iodine onto all surfaces in the primary system with which the contaminated reactor coolant comes in contact and subsequent exposure of personnel to the contaminated surfaces. This includes the surfaces of such apparatus as the reactor pressure vessel, the pressure vessel closure head, main coolant circulating pumps, heat exchangers, connecting piping, valves and other like apparatus. During normal operation, the health and safety problem does not exist because personnel do not expose themselves to the primary system components contaminated with radioactive iodine. During such operations as reactor refueling, reactor maintenance and primary system repairs, personnel will probably expose themselves to the radioactive components and the health hazard and reactor safety problems can exist.

As stated above, the health and safety problem is initially caused by release of fission products from the fuel elements or rods to the reactor coolant. Although the extent of the release of these fission products depends on the type of fuel rod used in the reactor, some fission product release can occur regardless of the type of fuel rod used. Unvented fuel rods comprising sealed cladding tubes containing fuel pellets are designed to keep the fission products contained within the fuel rod. Unvented fuel rods however have the disadvantage of limited fuel life due to the build-up of fission products which increases as a function of the reactor operation; and, the gas pressure built up within the sealed fuel rods, by the fission gases, places undue design limitations on the fuel cladding. Further, there is the possibility of rupture of one or more cladding tubes during reactor operation which results in releasing fission products to the reactor coolant. Vented fuel rods comprising fuel pellets contained within unsealed cladding tubes eliminates these problems; but, venting of the rods allows the fission products to be released directly to the reactor coolant. Thus, with either type of fuel rod it is possible for the reactor coolant to become contaminated with radioactive iodine-131 and iodine-125.

In the prior art, removal of the radioactive iodine contamination from the reactor coolant has been only partially effective. One reason for this is that iodine removal was accomplished as a by-product during removal of oxygen contamination by a cold trapping technique. Cold trapping is a process which operates by lowering the temperature of a contaminated liquid thereby reducing the solubility of the contaminant in the liquid and then precipitating the contaminant, such as oxygen, out of solution. It has been previously found that this oxygen removal process resulted in removal of approximately 50% of the iodine-131 present in the solution.

Another technique which has been employed to remove radioactive iodine involves adding hydrogen to contaminated sodium and then precipitating sodium hydride out of solution. The precipitated sodium hydride has been shown to contain the radioactive iodine isotopes as an impurity within the precipitant. Although this art does teach the effective removal of radioactive iodine from a reactor coolant, it suffers from the complexity of having to add gaseous hydrogen to a liquid. Another disadvantage of the prior art is the difficulty of determining if all or essentially all of the radioactive iodine isotopes have been removed because of the difficulty of determining the extent of the iodine contamination. Therefore, in the prior art, the biological hazard and the reactor safety problem of iodine contamination of the reactor coolant is not adequately eliminated, a relatively complex solution has been employed, or the degree of certainty of removal of the iodine is inadequate.

SUMMARY OF THE INVENTION

In accordance with this invention, a primary system of a liquid metal-cooled fast breeder nuclear reactor includes a purification bypass flow system having means which simply and effectively removes radioactive isotopes such as iodine-131 and iodine-125 nuclides from the reactor coolant. The purification bypass flow system comprises a separate flow system coupled in parallel with the primary system. When the level of the radioactive nuclide in the primary system reaches an unsafe level, or primary system operations are planned which may cause personnel exposure, the bypass system is put into operation and is continuously run until the level of radioactivity from the radioactive isotope contamination is sufficiently reduced.

The bypass flow system includes apparatus to introduce non-radioative isotopes of the radioactive element into the reactor coolant. For example, natural iodine is added where the radioactive nuclide is a radioactive isotope of iodine such as iodine-125 or iodine-131. A wire mesh basket containing the natural iodine and housed in a conventional sodium sample tube may be used for this purpose. The reactor coolant flowing passed the basket dissolves the iodine until the solubility limit of iodine in the sodium at the temperature of the sodium is reached. Then the temperature of the liquid sodium is lowered as it flows through a cold trap. This causes the sodium iodide to precipitate out of solution onto a wire mesh surface provided in the cold trap. It has been found that the precipitated sodium iodide contains the fission product nuclides, iodine-131 and iodine-125. In this manner, the reactor coolant is effectively and simply purified of iodine thereby eliminating the possible health hazards and reactor safety problems of the prior art.

BRIEF DESCRIPTION OF THE DRAWING

Other advantages of the invention will be apparent from the following detailed description taken in consideration with the accompanying drawing, in which the single FIGURE is a schematic of the purification bypass flow system.

DESCRIPTION OF THE PREFERRED EMBODIMENTS

Referring now to the drawing, a reactor coolant, such as liquid sodium is heated to reactor operating temperature on passage through a nuclear core contained within a reactor pressure vessel. The hot liquid sodium exits from the reactor pressure vessel and enters a main reactor coolant flow line 1. During normal reactor operation, isolation valves 2, 3 and 5 are closed which causes all of the reactor coolant to flow through the main reactor coolant flow line 1. After the reactor has been operated for some extended period of time, the reactor coolant can become contaminated by radioactive fission product nuclides, such as iodine-131 and iodine-125. Should this contamination build up to an unsafe level or if such operations as reactor refueling, reactor maintenance or primary systems repairs become necessary, then the iodine removal system is put into operation and the fission product contamination is removed.

By opening isolation valves 2 and 3 a portion of the reactor coolant is caused to flow through a bypass flow loop in the direction indicated by arrows 8, 9 and 10. This flow loop 8, 9 and 10 contains means to add natural, non-radioactive, isotopes of the contaminating elements, e.g. by adding natural iodine to the reactor coolant which is contaminated with iodide-131 and iodide-125. In the example shown by the figure, the amount of reactor coolant flowing through the bypass flow loop 8, 9 and 10, is determined by the pressure drop between points 6 and 7 in the main flow line 1. If additional reactor coolant flow through the flow loop 8, 9 and 10 is desired or deemed necessary, a motor driven pump, or like apparatus, may be included in the flow line downstream of isolation valve 2. The iodine adding means in the bypass flow loop 8, 9 and 10 comprises a conventional sodium sample tube 11 having a wire mesh basket 12 suspended therein. The wire mesh basket 12 contains a predetermined quantity of sodium iodide in solid form. The amount of sodium iodide required is determined by the solubility of the contaminated liquid sodium and the total quantity of the liquid sodium in the primary system. For a typical 1000 megawatt reactor with a $1 \times 10^6$ pound inventory of liquid sodium, approximately ⅛ of a pound of sodium iodide would be necessary to completely saturate the liquid sodium at the reactor outlet temperature of approximately 1000° F.

When all or most of the sodium iodide contained in the wire mesh basket 12 has been dissolved by the hot liquid sodium, at which time the concentration of iodine in sodium has reached approximately $5 \times 10^{-8}$ mol of iodine/mol of sodium, flow isolation valve 3 is closed and valves 4 and 5 are opened. This causes a portion of the fission product contaminated hot liquid sodium which is now saturated with iodine to flow through a bypass flow loop designated by arrows 8, 13 and 14. Again, the amount of the reactor coolant flowing through the bypass flow loop 8, 9 and 14 is determined by the corresponding pressure drop in the main flow line 1. Here also, a pump may be included downstream of the isolation valve 2 in order to increase the proportion of reactor coolant flowing in bypass loop 8, 13 and 14.

Within the bypass flow loop 8, 13 and 14, the hot saturated and contaminated liquid sodium is cooled to approximately 300° F. on passage through a cooling means such as a heat exchanger 15. The cooled reactor coolant exits from the cooling means 15 and enters a cold trap 16 where further cooling occurs and the iodine contaminants are removed. Within the cold trap 16, the liquid sodium is again cooled, but this time to approximately 250° F. at which temperature the solubility of iodine in sodium decreases from approximately $5 \times 10^{-8}$ to approximately $5 \times 10^{-10}$ mols of iodine/mols of sodium. Hence, the iodine concentration in the liquid sodium above $5 \times 10^{-10}$ mols of iodine/mols of sodium precipitates out of the solution onto a suitable removable device, such as a wire mesh surface 17, provided within the cold trap 16. As explained above, it has been found that sodium iodide which is the principal substance precipitated, contains the radioactive isotopes iodine-131 and iodine-125. It has been experimentally shown that the amount of radioactive iodine precipitated is proportionately equal to the amount of non-radioactive iodine precipitated. These experimental results have shown that the cold trap 16 removes 99.8% of all the iodine contained in the liquid sodium including the radioactive iodine. Removal of 99.8% of all the iodine, therefore results in removal of 99.8% of the radioactive iodine from the liquid sodium. After being purified, the liquid solution is reheated to the reactor outlet temperature of approximately 1000° F. by a suitable heating means such as heat exchanger 18. For optimal efficiency, the heat rejected in the cooling means 15 can be used as the heat source for the heating means 18. The reactor coolant then flows through isolation valve 5 prior to being reintroduced into the main reactor coolant flow line 1 where it continues along with the bulk of the reactor coolant to an intermediate heat exchanger (not shown).

The reactor coolant flowing in flow bypass loop 8, 13 and 14 comprising the iodine removal system is only a portion of the total reactor coolant flow. Therefore, in theory, the reactor coolant is not purified of all the radioactive fission products nuclides. But, continued operation of the iodine removal system lowers the concentration of iodine fission products in the total reactor coolant to an effectively safe level. An effectively safe level is a level at which subsequent deposition of the fission products on apparatus in the primary system does not constitute a health hazard or a reactor safety problem.

The effectively safe level of iodine contamination or more simply the level of decontamination of the sodium may be simply and accurately measured. Closing isolation valves 2 and 5 prevents further flow in the purification bypass loop 8, 9 and 14. The temperature of the sodium trapped in the flow loop 8, 9 and 14 is then allowed to decrease which causes the now stagnant sodium to become solid. The sodium sample tube 11 is unbolted at joints 19 and 20 and removed. The solid sodium in the sample tube 11 is conventionally analyzed to determine the iodine concentration. The accuracy of the measurement is enhanced over a similar measurement of the prior art because of the relatively large quantity of iodine contained in the sodium as a result of the natural, non-radioactive iodine added to the sodium in accordance with the teachings of this invention.

In another embodiment of this invention, the total inventory of reactor coolant is not first saturated with natural, non-radioactive iodine prior to commencement of removal of the radioactive iodine nuclides. In this embodiment, adding natural, non-radioactive iodine and removal of the radioactive iodine is accomplished by a single bypass purification flow system rather than a double, parallel connected flow system as in the preferred embodiment.

From the foregoing description, taken in connection with the drawing, it is seen that this invention provides a simple means to effectively remove radioactive fission product nuclides, comprising iodine-131 and iodine-125 from the liquid sodium coolant of a liquid metal-cooled fast breeder nuclear reactor. It further provides a simple means to accurately determine the iodine contamination or lack thereof.

Since numerous changes may be made in the above described apparatus, different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A method for continuously removing iodine-131 and iodine-125 from a liquid sodium reactor coolant of a nuclear reactor, said method comprising the steps of
    diverting a portion of said reactor coolant from a location in the main stream of said nuclear reactor to a bypass system,
    adding non-radioactive iodine to said reactor coolant by passing said diverted coolant over a solid body containing said non-radioactive iodine,
    then lowering the temperature of said diverted reactor coolant,
    precipitating said iodine-131 and iodine-125 from said bypassed reactor coolant,
    and reintroducing said bypassed reactor coolant into said main stream downstream of the point of said diverting location.

2. A method for removing iodine-131 and iodine-125 from a liquid-metal reactor coolant of a nuclear reactor, said method comprising the steps of:
    (a) passing said coolant about a solid body of at least one non-radioactive isotope of iodine thereby dissolving said non-radioactive iodine into said liquid metal to the solubility limit of iodine in said liquid metal at the temperature of said liquid metal;
    (b) then diverting a portion of said reactor coolant from a main stream of said nuclear reactor to a bypass system;
    (c) then lowering the temperature of said bypassed reactor coolant;
    (d) precipitating said iodine-131, iodine-125 and non-radioactive iodine from said bypassed reactor coolant onto a nuclide removal means;
    (e) and reintroducing said bypassed reactor coolant into said main stream.

3. The method of claim 2 further comprising the step of removing said nuclide removal means from said bypass system.

4. The method of claim 2 wherein the step of passing said coolant about a solid body includes passing said coolant about a solid body of at least one non-radioactive isotope of iodine in the solid state.

5. The method of claim 2 wherein the step of precipitating said iodine-131, iodine-125 and non-radioactive iodine comprises precipitating a compound comprising said liquid-metal reactor coolant, said non-radioactive isotope of iodine, and said iodine-131 and iodine-125.

6. The method of claim 5 wherein said coolant is sodium and said precipitated compound includes sodium iodide.

7. A method for removing iodine-131 and iodine-125 from a liquid sodium reactor coolant of a nuclear reactor, said method comprising the steps of:
    (a) diverting a portion of said reactor coolant from a main stream of said nuclear reactor to a bypass system;
    (b) adding non-radioactive iodine from a solid surface to said reactor coolant;
    (c) then lowering the temperature of said bypassed reactor coolant;
    (d) precipitating said iodine-131 and iodine-125 from said bypassed reactor coolant onto a nuclide removal device;
    (e) and then reintroducing said bypassed reactor coolant into said main stream.

8. The method of claim 7 further comprising the step of removing said nuclide removal device from said bypass system.

9. A system for continuously removing iodine-131 and iodine-125 from a liquid-metal reactor coolant circulating through a primary system of a nuclear reactor comprising:
    (a) means connected to said primary system for adding non-radioactive iodine from a solid surface to said reactor coolant,
    (b) means connected to said primary system for bypassing a portion of said reactor coolant from a selected location in said primary system and returning, downstream of said selected location, said portion of said reactor coolant to said primary system, and (c) apparatus in said bypass means for removing said iodine-131, iodine-125 and non-radioactive iodine from said bypass reactor coolant.

10. The system of claim 9 wherein said solid surface comprises a body of non-radioactive iodine in solid form.

11. The system of claim 10 wherein said liquid-metal is sodium and said body of iodine in solid form includes sodium iodide.

12. The system of claim 11 wherein said means for adding non-radioactive iodine comprises:
- a sodium sample tube, said sample tube being removable from said connection to said primary system; and
- a container connected within said sample tube for containing said sodium iodide to be added to said reactor coolant.

13. The system of claim 12 wherein said container comprises a wire mesh basket and wherein said sodium iodide is suspended within said wire mesh basket.

14. The system of claim 9 wherein said apparatus for removing said iodine-131, iodine-125 and non-radioactive iodine from said bypassed reactor coolant comprises:
- working means for lowering the temperature of said reactor coolant,
- precipitator means connected to said working means for precipitating and collecting some of said iodine-131, iodine-125 and non-radioactive iodine from said reactor coolant, and
- heating means connected to said precipitator means for raising the temperature of said bypassed reactor coolant with said iodine-131, iodine-125 and non-radioactive iodine removed.

15. The system of claim 14 wherein said precipitator means for precipitating and collecting said precipitated iodine-131, iodine-125 and non-radioactive iodine comprises:
- an outer sheel for containing said reactor coolant flowing therein,
- cooling means connected to said precipitator means for lowering the temperature of said reactor coolant, and
- collecting means contained within said outer shell for collecting said precipitated iodine-131, iodine-125 and non-radioactive iodine.

16. The system of claim 15 wherein said collecting means comprises wire mesh, said wire mesh serving as a depository surface for said precipitated iodine-131, iodine-125 and non-radioactive iodine.

* * * * *